US010318185B2

(12) United States Patent
Hady

(10) Patent No.: US 10,318,185 B2
(45) Date of Patent: Jun. 11, 2019

(54) METHOD AND APPARATUS TO PROVIDE BOTH STORAGE MODE AND MEMORY MODE ACCESS TO NON-VOLATILE MEMORY WITHIN A SOLID STATE DRIVE

(71) Applicant: Intel Corporation, Santa Clara, CA (US)

(72) Inventor: Frank Hady, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/200,933

(22) Filed: Jul. 1, 2016

(65) Prior Publication Data
US 2018/0004438 A1  Jan. 4, 2018

(51) Int. Cl.
*G06F 3/06* (2006.01)
*G06F 12/02* (2006.01)

(52) U.S. Cl.
CPC ............ *G06F 3/0619* (2013.01); *G06F 3/061* (2013.01); *G06F 3/065* (2013.01); *G06F 3/0634* (2013.01); *G06F 3/0679* (2013.01); *G06F 3/0688* (2013.01); *G06F 12/0246* (2013.01); *G06F 3/0625* (2013.01); *G06F 12/0238* (2013.01); *G06F 2212/7201* (2013.01); *Y02D 10/13* (2018.01); *Y02D 10/154* (2018.01)

(58) Field of Classification Search
None
See application file for complete search history.

(56) References Cited

U.S. PATENT DOCUMENTS

| 6,813,678 B1* | 11/2004 | Sinclair ................. G06F 3/0626 711/103 |
| 2005/0204187 A1* | 9/2005 | Lee ..................... G06F 12/0246 714/6.13 |
| 2006/0161728 A1* | 7/2006 | Bennett ............... G06F 12/0246 711/103 |
| 2006/0179263 A1* | 8/2006 | Song ....................... G06F 3/061 711/170 |
| 2008/0082736 A1* | 4/2008 | Chow ................. G06F 12/0246 711/103 |
| 2009/0164704 A1* | 6/2009 | Kanade ............... G06F 11/1068 711/103 |

(Continued)

FOREIGN PATENT DOCUMENTS

WO    WO 2012166548 A2    12/2012

OTHER PUBLICATIONS

International search report dated Sep. 4, 2017; for PCT Application No. PCT/US17/35557; filed Jun. 1, 2017; 13 pages.

*Primary Examiner* — J. H. Hur
(74) *Attorney, Agent, or Firm* — Thorpe North & Western, LLP

(57) ABSTRACT

An apparatus is described. The apparatus can include non-volatile memory, an embedded processor, and a memory controller. The memory controller can access data from the byte addressable non-volatile memory using at least one of: a first addressing scheme or a second addressing scheme. The memory controller can provide the data to a host system over a first interface when the data is accessed using the first addressing scheme. The memory controller can provide the data to the embedded processor over a second interface when the data is accessed using the second addressing scheme.

25 Claims, 5 Drawing Sheets

(56) References Cited

U.S. PATENT DOCUMENTS

| | | | |
|---|---|---|---|
| 2010/0023672 A1* | 1/2010 | Gorobets | G06F 12/0246 |
| | | | 711/103 |
| 2010/0037001 A1* | 2/2010 | Langlois | G06F 12/0246 |
| | | | 711/103 |
| 2011/0161784 A1* | 6/2011 | Selinger | G06F 11/1068 |
| | | | 714/768 |
| 2014/0181365 A1 | 6/2014 | Fanning et al. | |
| 2016/0299688 A1* | 10/2016 | Devendrappa | G06F 3/061 |
| 2016/0378337 A1* | 12/2016 | Horspool | G06F 3/0659 |
| | | | 711/103 |

* cited by examiner

METHOD AND APPARATUS TO PROVIDE BOTH STORAGE MODE AND MEMORY MODE ACCESS TO NON-VOLATILE MEMORY WITHIN A SOLID STATE DRIVE

BACKGROUND

Hard Disk Drives (HDDs) are often used in computer systems for persistent data storage. The data in an HDD is stored on rotating magnetic media and accessed on a block-basis. For example, a standard HDD data block size may be a 512 byte sector. Because of the block-based nature of HDDs, related interfaces, storage software, operating systems, and other software are written and designed to allow or employ a block-based access technique or scheme.

BRIEF DESCRIPTION OF THE DRAWINGS

Features and advantages of embodiments will be apparent from the detailed description which follows, taken in conjunction with the accompanying drawings, which together illustrate, by way of example, embodiment features; and, wherein.

Figure 1:
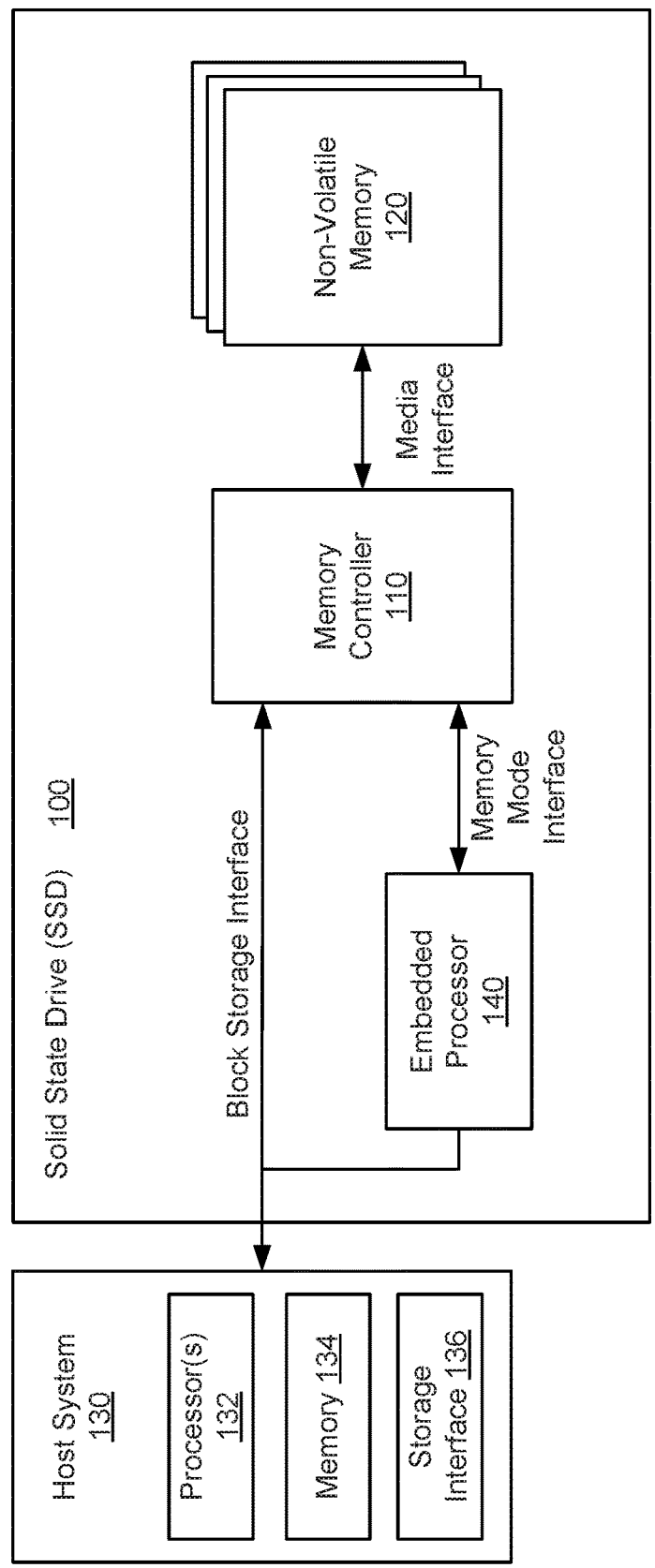
FIG. 1 illustrates a solid state drive (SSD) with a memory controller that is operable to access non-volatile memory via a block storage mode or a memory mode in accordance with an example embodiment.

Reference will now be made to the exemplary embodiments illustrated, and specific language will be used herein to describe the same. It will nevertheless be understood that no limitation on disclosure scope is thereby intended.

Description Of Embodiments

Before the disclosed embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof.

As used in this written description, the singular forms "a," "an" and "the" include express support for plural referents unless the context clearly dictates otherwise. Thus, for example, reference to "a bit line" includes support for a plurality of such bit lines.

Reference throughout this specification to "an example" means that a particular feature, structure, or characteristic described in connection with the example is included in at least one embodiment. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

As use herein, "comprises," "comprising," "containing" and "having" and the like can have the meaning ascribed to them in U.S. Patent law and can mean, "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that express support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology embodiments more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

Solid state drives (SSDs) use non-volatile memory to persistently store data. SSDs can use host interfaces compatible with traditional block input/output (I/O) hard disk drives. In other words, non-volatile memory on the SSDs can be accessed as block storage, in which blocks of data are programmed (or written), read, or erased from the non-volatile memory. A host system can access data in the non-volatile memory in the solid state drive (SSD) via a host interface. The host interface can establish an interface for accessing the data stored in the non-volatile memory. The host interface can be configured to utilize any suitable communication protocol to facilitate communications with the non-volatile memory depending on a type of SSD. For example, the host interface can be configured to communicate with the host system using Serial Advanced Technology Attachment (SATA), Peripheral Component Interconnect express (PCIe), Serial Attached SCSI (SAS), Universal Serial Bus (USB), and/or other communication protocol and/or technology.

A request to access data stored in the non-volatile memory can use a logical block addressing (LBA) scheme, which can be used to determine the physical location of the blocks of data stored in the non-volatile memory. For example, each block of data can be a 512 byte sector of data. Block storage access to the non-volatile memory can be compatible with operating systems (OS) and applications.

In one example, SSDs can include various types of non-volatile memory (NVM), such as phase change memory (PCM), three dimensional (3D) crosspoint memory, resistive memory, nanowire memory, ferro-electric transistor random access memory (FeTRAM), flash memory such as NAND, and NOR memory, magnetoresistive random access memory (MRAM) memory that incorporates memristor technology, spin transfer torque (STT)-MRAM, and/or write in place non-volatile MRAM (NVMRAM).

Storage devices such as Hard disk drives and Solid State Drives (SSD)s are accessed at a block level. As a result, operating systems are generally designed to access storage devices as block addressable devices. Dynamic random-access memory (DRAM) and other types of volatile memory are typically accessed at a byte level. Byte addressable write-in-place non-volatile memory, such as 3D crosspoint memory can be both block addressable and byte addressable. Such non-volatile memory can be compatible with a memory addressing scheme (such as a byte addressing scheme), in which individual bytes of data can be stored or accessed from the non-volatile memory. The ability to access the data in non-volatile memory in terms of bytes (as opposed to blocks of data) can be referred to as a "memory mode".

In some embodiments, data stored in the non-volatile memory (e.g., byte addressable write-in-place non-volatile memory) can be accessed by a non-volatile memory controller via a block storage mode or a memory mode. The block storage mode is in line with the traditional mechanism used by a non-volatile memory controller in the SSD to access data stored on the non-volatile memory. In the block storage mode, the memory controller can use a block addressing scheme (or block storage semantics), such as an LBA scheme, to access the data stored in the non-volatile memory via the block host interface. On the other hand, in the memory mode, the memory controller can use a memory addressing scheme (or memory address semantics) to access the data stored in the non-volatile memory. In one specific example, the memory addressing scheme can be a byte addressable scheme.

In some embodiments, with respect to the block storage mode that uses the block addressing scheme, the data can be accessible to an external host system via a block storage interface between the memory controller and the external host system. In other words, the host system can be external to the SSD. With respect to the memory mode that uses the memory addressing scheme, the data can be accessible from non-volatile memory internally to an embedded processor in the SSD via a memory mode interface between the memory controller and the embedded processor. The embedded processor can access the data in the non-volatile memory using load/store operations, which can reduce access time to the data as compared to the block storage interface used by the external host system. Therefore, the memory controller can access the same data on the same media (i.e., non-volatile memory (NVM) of the SSD) when operating in either the block storage mode or the memory mode.

In one example, the capability of the SSD to support both the block storage mode and the memory mode permits the host system to access data stored in the non-volatile memory using the traditional block storage interface, while the same data is also accessible to the embedded processor within the SSD over the memory mode interface. The incorporation of the memory mode interface in the SSD, while preserving the traditional block storage interface, avoids changes to the host system, operating system (OS), applications, etc. that use the traditional block storage interface to access data stored in the non-volatile memory of the SSD. In addition, the incorporation of the memory mode interface enables the embedded processor to access the same data that is available to the host system via the block storage interface.

FIG. 1 illustrates an example of a solid state drive (SSD) 100 with a memory controller 110 that is operable to access data stored on non-volatile memory 120 via a block storage mode or a memory mode. In the block storage mode, the memory controller 110 can access data in the non-volatile memory 120 using a block addressing scheme (block storage semantics), such as a logical block addressing (LBA) scheme. The memory controller 110 can access the data in the non-volatile memory 120 over a media interface between the memory controller 110 and the non-volatile memory 120. The memory controller 110 can provide the data to a host system 130 via a block storage interface using a standard block storage communication protocol between the memory controller 110 and the host system 130. The host system 130 can be external to the SSD 100. The host system 130 can include processor(s) 132, memory 134 and a storage interface 136. In the memory mode, the memory controller 110 can access data in the non-volatile memory 120 using a memory addressing scheme (memory address semantics), such as a byte addressing scheme, and provide the data to an embedded processor 140 in the SSD 100 via a memory mode interface between the memory controller 110 and the embedded processor 140. Therefore, the memory controller 110 can access the same data in the non-volatile memory using the block storage mode or the memory address mode.

In one example, the memory controller 110 can perform read and write operations with data stored in the non-volatile memory 120 based on commands received from the host system 130 via the block storage interface. For example, the memory controller 110 can read data in the non-volatile memory 120 using the LBA scheme and provide the data to the host system 130 via the block storage interface. In another example, the memory controller 110 can write data to the non-volatile memory 120 using the LBA scheme based on commands received from the host system 130 via the block storage interface.

In one example, the memory controller 110 can store or access data in the non-volatile memory 120. For example, the data can be stored or accessed based on instructions stored in memory in the SSD that is to be executed by the embedded processor 140. The memory controller 110 can access data in the non-volatile memory 120 using the memory addressing scheme, and the data can be provided from the memory controller 110 to the embedded processor 140 via the memory mode interface. In another example, the memory controller 110 can store data in the non-volatile memory 120 using the memory addressing scheme.

As previously described, the host system 130 can access data stored in the non-volatile memory 120 over the block storage interface via the memory controller 110. The block storage interface is a standard block storage communication protocol that is used by the host system 130 to access blocks of data stored in the non-volatile memory 120. The SSD 100 can use the block storage interface to avoid changes to the host system 130, operating system (OS), applications, etc. that use the traditional block storage interface to access the data in the non-volatile memory 120. In addition, the same data in the non-volatile memory 120 can be accessed internally by the embedded processor 140 in the SSD 100. The embedded processor 140 can access the data via the memory controller 110 over the memory mode interface. In addition, the embedded processor 140 can access the data via the memory controller 110 over the block storage interface.

In one example, the embedded processor 140 can internally perform various functionalities with the data accessed from the non-volatile memory 120. For example, the embedded processor 140 can perform localized search and/or replace functions on data stored in the non-volatile memory 120. As another example, the embedded processor 140 can perform localized data scrubbing or error correction on the data stored in the non-volatile memory 120. In addition, the embedded processor 140 can perform regular expression pattern matching and data copying. Such functionalities can be performed with increased execution times and reduced power levels since the functions are performed with the data stored internally in the SSD 100, as opposed to the functions being performed only after the data is transferred to the host system 130.

In one example, the memory controller 110 can function to perform media management of the non-volatile memory 120. For example, the memory controller 110 can correct errors on read operations to the non-volatile memory 120, move data on write operations to the non-volatile memory 120, and refresh data on read operations and write operations and over a period of time. Another example of media management can include wear leveling, which can prolong a service life of the non-volatile memory 120. In addition, the media management performed by the memory controller 110 can be architecturally separated from the embedded processor 140, such that data accessed from the non-volatile memory 120 by the embedded processor 140 does not interfere with the media management performed at the memory controller 110.

As previously described, the memory controller 110 can provide the embedded processor 140 with access to data in the non-volatile memory 120 through the memory mode interface, which is separate from the block storage interface to the host system 130. In one example, the memory mode interface can enable the embedded processor 140 to access the data from the non-volatile memory 120 at a more granular level as compared to the block storage interface. For example, while the block storage interface may enable the host system 130 to access 512 byte blocks of data from the non-volatile memory 120, the memory mode interface can enable the embedded processor 140 to access a smaller size of data, such as a 128 byte block of data. In another example, the memory mode interface can enable the embedded processor 140 to access the data from the non-volatile memory 120 in a reduced period of time as compared to the block storage interface. For example, data in the non-volatile memory 120 can be accessed via the memory mode interface using efficient load and store operations, which can be completed in hundreds of nanoseconds, as opposed to slower read and write block storage operations which can take five or more micro seconds.

In one configuration, the host system 130 can read and write data to the non-volatile memory 120 using the block addressing scheme, and that same data can be manipulated by the embedded processor 140 using the memory addressing scheme. The memory controller 110 can maintain an address map (or other type of mathematical relationship or mathematical mapping) between the two address spaces, and the address map can enable the memory controller 110 to switch between the block storage mode and the memory mode when performing data operations. As an example, the memory controller 110 can use the address map when writing data to the non-volatile memory 120 using the block addressing scheme, and then access the data from the non-volatile memory 120 using the memory addressing scheme. As another example, the memory controller 110 can use the address map when storing data to the non-volatile memory 120 using the memory addressing scheme, and then read the data from the non-volatile memory 120 using the block addressing scheme. In this example, the embedded processor 140 can retrieve data from the non-volatile memory 120, generate modified data, and store the modified data in the non-volatile memory 120, and the modified data can be accessible to the host system 130.

Figure 2:
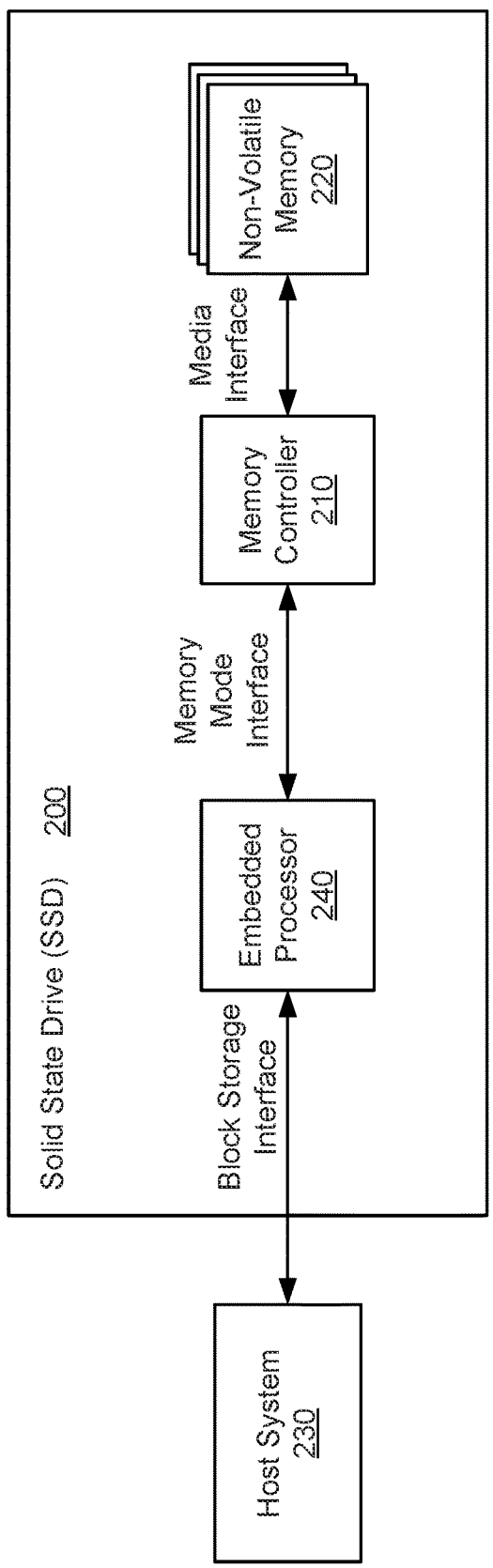
FIG. 2 illustrates an SSD with a memory controller that is operable to access non-volatile memory via a memory mode in accordance with an example embodiment.

FIG. 2 illustrates an example of a solid state drive (SSD) 200 with a memory controller 210 that is operable to access non-volatile memory 220 via a memory mode. In the memory mode, the memory controller 210 can access data stored in the non-volatile memory 220 using a memory addressing scheme (or memory semantics). One example of the memory addressing scheme is a byte addressing scheme. The memory controller 210 can access the data in the non-volatile memory 220 over a media interface between the memory controller 210 and the non-volatile memory 220. The memory controller 210 can provide the data to an embedded processor 240 in the SSD 200 via a memory mode interface between the memory controller 210 and the embedded processor 240. The embedded processor 240 can internally perform various functionalities with the data accessed from the non-volatile memory 220, such as local search operations and/or local data scrubbing (or error correction) operations.

In one example, a host system 230 external to the SSD 200 can also access the data stored in the non-volatile memory 220 of the SSD 200. The host system 230 can provide read/write commands to the embedded processor 240 over a block storage interface between the host system 230 and the embedded processor 240. The host system 230 can provide the read/write commands using a block addressing scheme, such as a logical block addressing (LBA) scheme. The embedded processor 240 can translate the read/write commands using the block addressing scheme to load/store commands using the memory addressing scheme. The embedded processor 240 can translate the commands based on known relationships between the block addressing scheme and the memory addressing scheme. At this point, the embedded processor 240 can store/access data from the non-volatile memory 220 via the memory mode interface between the embedded processor 240 and the memory controller 210. When the host system 230 provides a command to access data, the embedded processor 240 can access the data from the non-volatile memory 220 and provide the data to the host system 230. Therefore, in this example, data transfers between the host system 230 and the non-volatile memory 220 can traverse the embedded processor 240.

As shown in FIG. 2, the memory controller 210 can access data from the non-volatile memory using the memory addressing scheme (as opposed to the block addressing scheme). The host system 230 can continue to use the block addressing scheme. The embedded processor 240 can serve as an intermediary between the host system 230 and the memory controller 210. In other words, the embedded processor 240 can maintain the block storage interface with the host system 230, and the embedded processor 240 can maintain the memory mode interface with the memory controller 210. However, in this example, power consumption at the embedded processor 240 can be increased since the data transfers between the host system 230 and the non-volatile memory 220 traverse the embedded processor 240.

Figure 3:
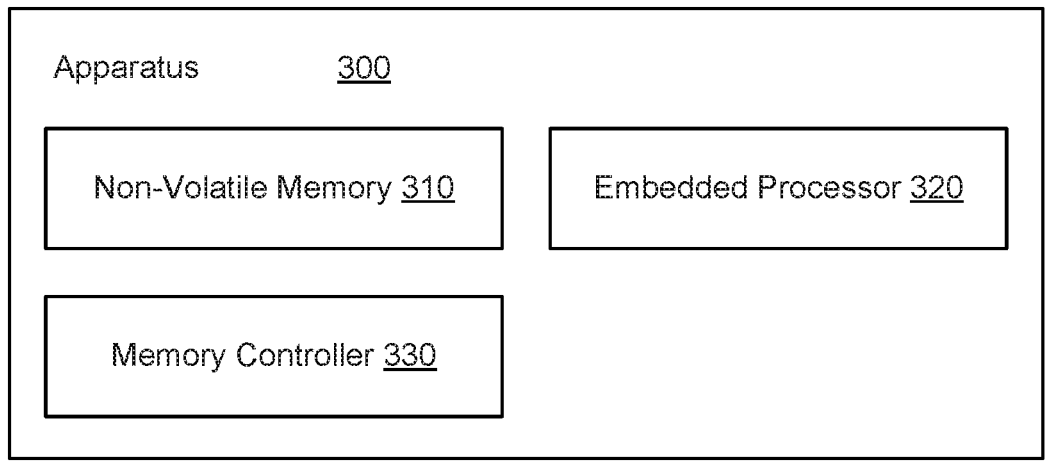
FIG. 3 is a diagram of an apparatus in accordance with an example embodiment.

FIG. 3 is an exemplary diagram of an apparatus 300. The apparatus 300 can include non-volatile memory 310, an embedded processor 320, and a memory controller 330. The memory controller 330 can comprise logic to: access data from the non-volatile memory 310 using at least one of: a first addressing scheme or a second addressing scheme. The memory controller 330 can comprise logic to: provide the data to an external host system over a first interface when the data is accessed using the first addressing scheme. The memory controller 330 can comprise logic to: provide the data to the embedded processor 320 over a second interface when the data is accessed using the second addressing scheme.

Figure 4:
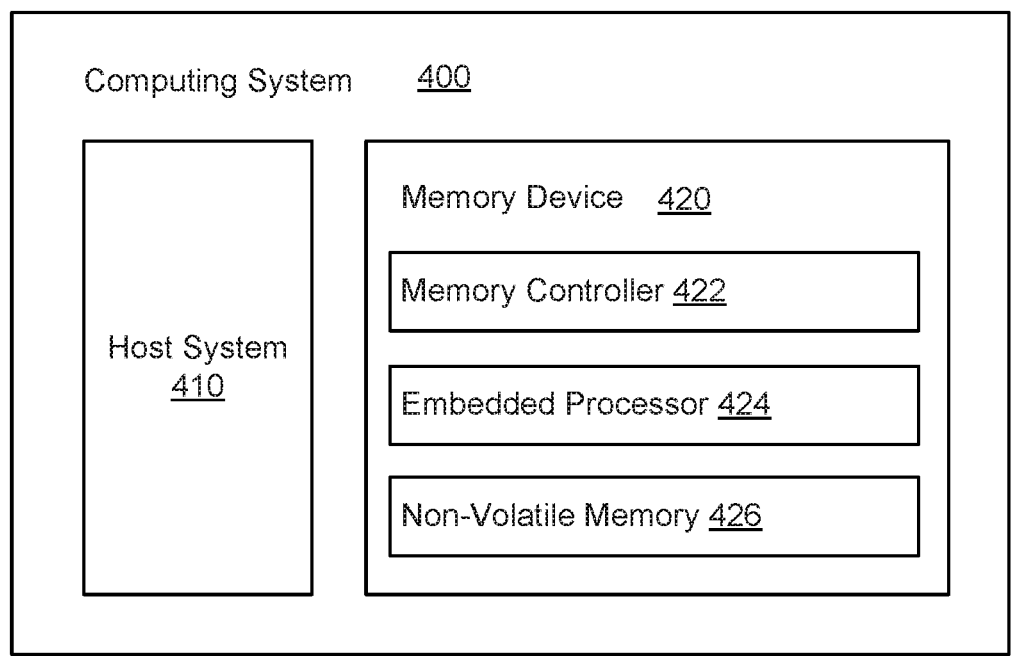
FIG. 4 is a diagram of a computing system in accordance with an example embodiment.

FIG. 4 is an exemplary diagram of a computing system 400. The computing system 400 can include a host system 410 and a memory device 420. The memory device 420 can include a memory controller 422, an embedded processor 424 and non-volatile memory 426. The non-volatile memory 426 can include data that is accessible to the host system 410 via the memory controller 422 over a first interface that uses a first addressing scheme. The non-volatile memory 426 can include data that is accessible to the embedded processor 424 via the memory controller 422 over a second interface that uses a second addressing scheme.

Figure 5:
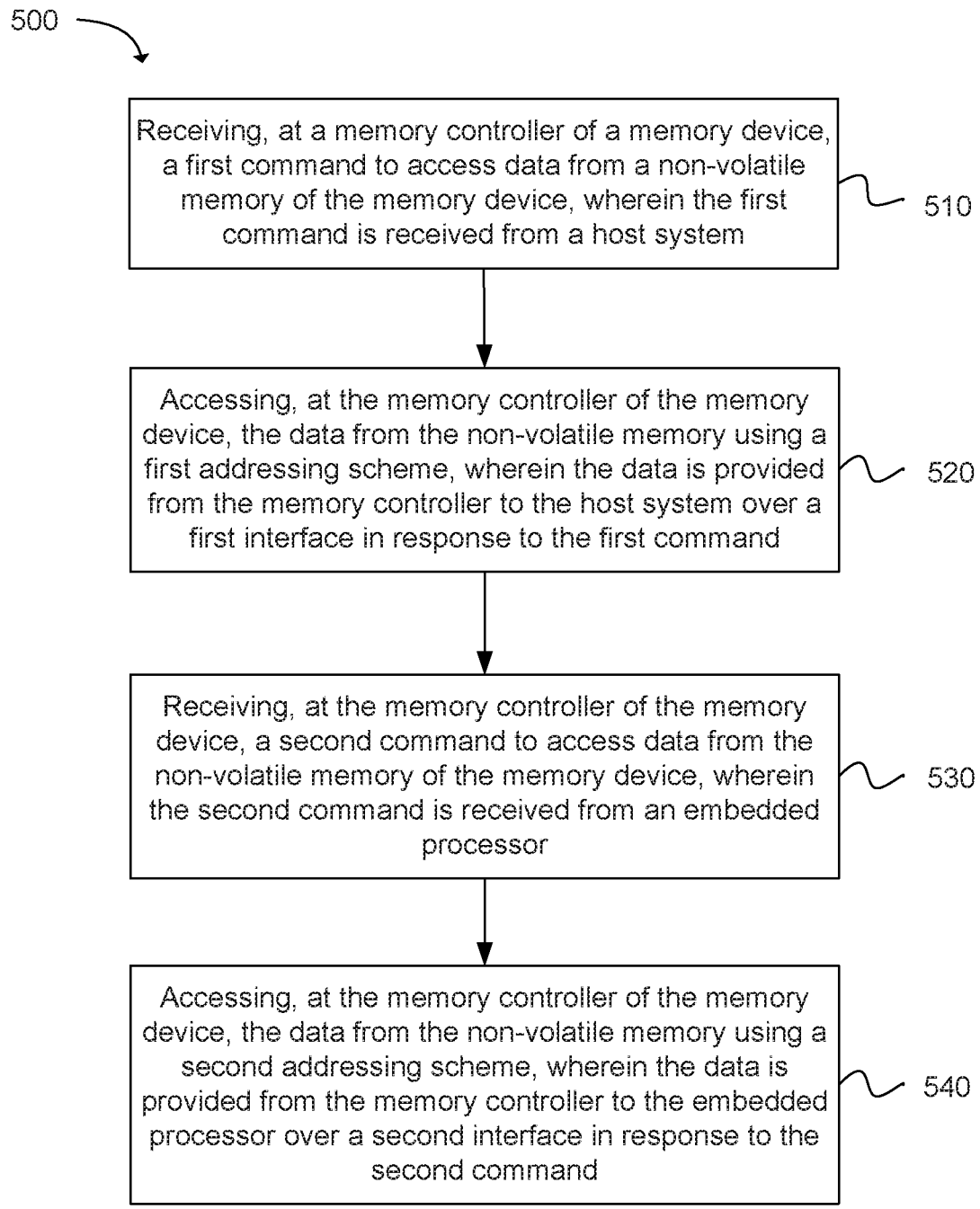
FIG. 5 depicts a flowchart of a method for accessing data from non-volatile memory in accordance with an example embodiment.

Another example provides a method 500 for accessing data from non-volatile memory, as shown in the flow chart in FIG. 5. The method can be executed as instructions on a machine, where the instructions are included on at least one computer readable medium or one non-transitory machine readable storage medium. The method can include the operation of: receiving, at a memory controller of a memory device, a first command to access data from a non-volatile memory of the memory device, wherein the first command is received from a host system, as in block 510. The method can include the operation of: accessing, at the memory controller of the memory device, the data from the non-volatile memory using a first addressing scheme, wherein the data is provided from the memory controller to the host system over a first interface in response to the first command, as in block 520. The method can include the operation of: receiving, at the memory controller of the memory device, a second command to access data from the non-volatile memory of the memory device, wherein the second command is received from an embedded processor, as in block 530. The method can include the operation of: accessing, at the memory controller of the memory device, the data from the non-volatile memory using a second addressing scheme, wherein the data is provided from the memory controller to the embedded processor over a second interface in response to the second command, as in block 540.

Figure 6:
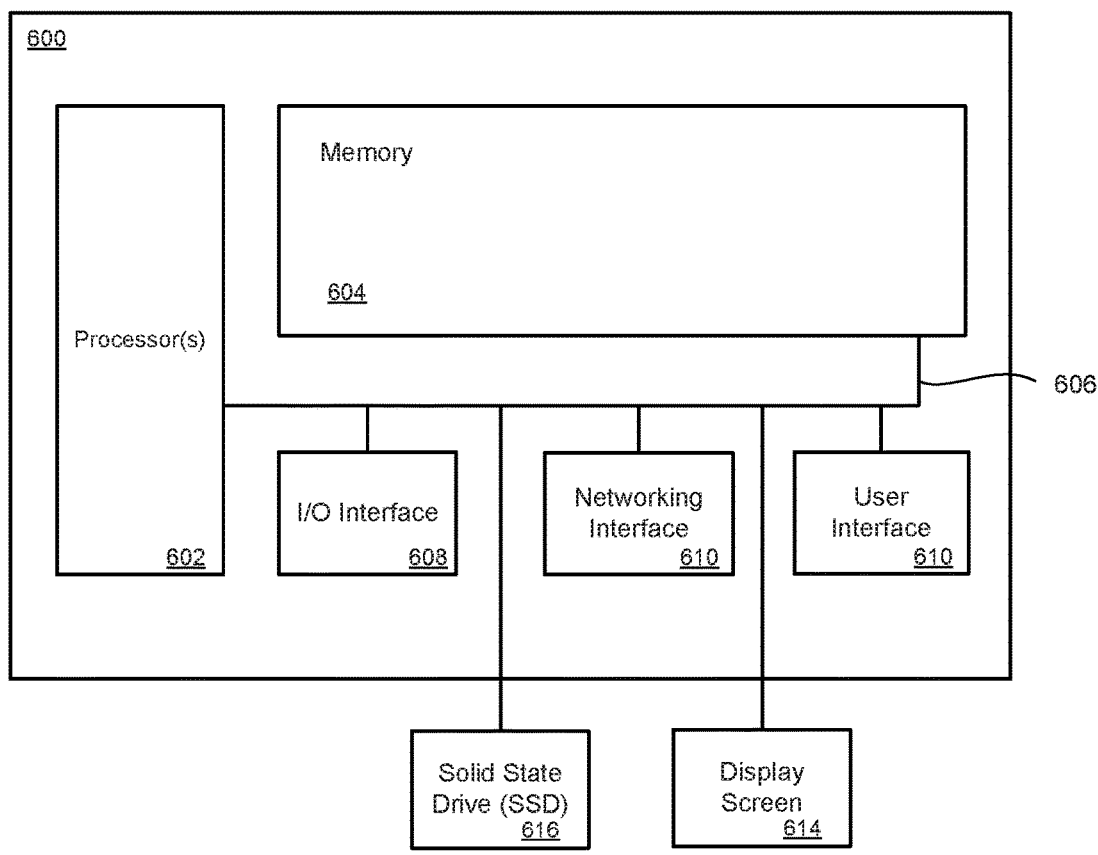
FIG. 6 illustrates a computing system that includes a data storage device in accordance with an example embodiment.

FIG. 6 illustrates a general computing system 600 that can be employed in embodiments of the present technology. The computing system 600 can be connected to a solid state drive (SSD) 616. The SSD 616 can be located outside the computing system 600, or alternatively, the SSD 616 can be located within the computing system 600. The computing system 600 can include a processor 602 in communication with a memory 604. The memory 604 can include any device, combination of devices, circuitry, and the like that is capable of storing, accessing, organizing and/or retrieving data. Non-limiting examples include volatile or non-volatile RAM, phase change memory, optical media, hard-drive type media, and the like, including combinations thereof.

The computing system 600 additionally includes a local communication interface 606 for connectivity between the various components of the system. For example, the local communication interface 606 can be a local data bus and/or any related address or control busses as may be desired.

The computing system 600 can also include an I/O (input/output) interface 608 for controlling the I/O functions of the system, as well as for I/O connectivity to devices outside or inside of the computing system 600. A network interface 610 can also be included for network connectivity. The network interface 610 can control network communications both within the system and outside of the system. The network interface can include a wired interface, a wireless interface, a Bluetooth interface, optical interface, and the like, including appropriate combinations thereof. Furthermore, the computing system 600 can additionally include a user interface 612, a display device 614, as well as various other components that would be beneficial for such a system.

The processor 602 can be a single or multiple processors, and the memory 604 can be a single or multiple memories. The local communication interface 606 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific embodiments and point out specific features, elements, or steps that can be used or otherwise combined in achieving such embodiments.

In one example there is provided an apparatus comprising:
  a byte addressable non-volatile memory;
  an embedded processor; and
  a memory controller comprising logic to:
    access data from the byte addressable non-volatile memory using at least one of: a first addressing scheme or a second addressing scheme;
    provide the data to a host system over a first interface when the data is accessed using the first addressing scheme; and
    provide the data to the embedded processor over a second interface when the data is accessed using the second addressing scheme.

In one example of an apparatus, the first addressing scheme is a logical block addressing (LBA) scheme and the first interface is a block storage interface.

In one example of an apparatus, the second addressing scheme is a memory addressing scheme and the second interface is a memory mode interface, wherein the memory addressing scheme includes a byte addressing scheme.

In one example of an apparatus, the memory controller further comprises logic to access same data from the byte addressable non-volatile memory using the first addressing scheme or the second addressing scheme.

In one example of an apparatus, the memory controller further comprises logic to provide the data over the second interface to the embedded processor to enable the embedded processor to perform localized searching, localized error correction, expression pattern matching or data copying on the data without transferring the data to the host system.

In one example of an apparatus, the memory controller further comprises logic to maintain an address map to write data to the byte addressable non-volatile memory using the first addressing scheme and access the data from the byte addressable non-volatile memory using the second addressing scheme.

In one example of an apparatus, the memory controller further comprises logic to maintain an address mapping to store data to the byte addressable non-volatile memory using the second addressing scheme and read the data from the byte addressable non-volatile memory using the first addressing scheme.

In one example of an apparatus, the second addressing scheme enables the memory controller to access the data from the byte addressable non-volatile memory at a more granular level as compared to the first addressing scheme.

In one example of an apparatus, the second addressing scheme enables the memory controller to access the data from the byte addressable non-volatile memory in a reduced period of time as compared to the first addressing scheme.

In one example of an apparatus, the second addressing scheme enables the memory controller to access the data from the byte addressable non-volatile memory with a reduced level of power consumption as compared to the first addressing scheme.

In one example of an apparatus, the memory controller further comprises logic to perform media management in the byte addressable non-volatile memory and the media management is abstracted from the data that is accessed by the memory controller from the byte addressable non-volatile memory using the second addressing scheme.

In one example of an apparatus, the apparatus is a solid state drive (SSD).

In one example there is provided a computing system comprising
a host system; and
a memory device comprising:
  a memory controller;
  an embedded processor; and
  non-volatile memory comprising:
    data that is accessible to the host system via the memory controller over a first interface that uses a first addressing scheme; and
    data that is accessible to the embedded processor via the memory controller over a second interface that uses a second addressing scheme.

In one example of a computing system, the first addressing scheme is a logical block addressing (LBA) scheme and the first interface is a block storage interface.

In one example of a computing system, the second addressing scheme is a memory addressing scheme and the second interface is a memory mode interface, wherein the memory addressing scheme includes a byte addressing scheme.

In one example of a computing system, the embedded processor comprises logic to:
access the data from the non-volatile memory via the memory controller over the memory mode interface; and
perform localized searching or localized error correction on the data without transferring the data to the host system.

In one example of a computing system, the data that is accessible to the host system via the memory controller further traverses the embedded processor enroute to the host system.

In one example of a computing system, the memory controller further comprises logic to access same data from the non-volatile memory using the first addressing scheme or the second addressing scheme.

In one example of a computing system, the memory device is a solid-state drive (SSD).

In one example of a computing system, the computing system further comprises one or more of:
a display communicatively coupled to the host system;
a network interface communicatively coupled to the host system; or
a battery coupled to the host system.

In one example there is provided a method for accessing data from non-volatile memory, the method comprising:
receiving, at a memory controller of a memory device, a first command to access data from a non-volatile memory of the memory device, wherein the first command is received from a host system;
accessing, at the memory controller of the memory device, the data from the non-volatile memory using a first addressing scheme, wherein the data is provided from the memory controller to the host system over a first interface in response to the first command;
receiving, at the memory controller of the memory device, a second command to access data from the non-volatile memory of the memory device, wherein the second command is received from an embedded processor; and
accessing, at the memory controller of the memory device, the data from the non-volatile memory using a second addressing scheme, wherein the data is provided from the memory controller to the embedded processor over a second interface in response to the second command.

In one example of a method for accessing data from non-volatile memory, the first addressing scheme is a logical block addressing (LBA) scheme and the first interface is a block storage interface.

In one example of a method for accessing data from non-volatile memory, the second addressing scheme is a memory addressing scheme and the second interface is a memory mode interface, wherein the memory addressing scheme includes a byte addressing scheme.

In one example of a method for accessing data from non-volatile memory, the method further comprises providing the data over the second interface to the embedded processor to enable the embedded processor to perform localized searching or localized error correction on the data without transferring the data to the host system.

In one example of a method for accessing data from non-volatile memory, the method further comprises maintaining an address map to write data to the non-volatile memory using the first addressing scheme and access the data from the non-volatile memory using the second addressing scheme.

In one example of a method for accessing data from non-volatile memory, the method further comprises maintaining an address map to store data to the non-volatile memory using the second addressing scheme and read the data from the non-volatile memory using the first addressing scheme.

While the forgoing examples are illustrative of the principles of various embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. An apparatus, comprising:
   a byte-addressable write-in-place non-volatile memory;
   an embedded processor;
   a memory controller communicatively coupled to the byte-addressable write-in-place non-volatile memory;
   a block storage interface configured to communicatively couple to a host system having a host processor, to the embedded processor, and to the memory controller;
   a memory mode interface communicatively coupled between the embedded processor and the memory controller, the memory controller comprising logic to:
   receive a data operation request for data;
      if the data operation request is received from the host system over the block storage interface, access the data in the byte-addressable write-in-place non-volatile memory in a block storage mode using block addressing; and
      if the data operation request is received from the embedded processor over the memory mode interface, access the data in the byte-addressable write-in-place non-volatile memory in a memory mode using memory addressing.

2. The apparatus of claim 1, wherein the block storage mode is a logical block addressing (LBA) scheme.

3. The apparatus of claim 1, wherein the memory mode is a byte-addressable write-in-place addressing scheme.

4. The apparatus of claim 1, wherein the memory controller further comprises logic to access same data from the byte-addressable write-in-place non-volatile memory using the block storage mode or the memory mode.

5. The apparatus of claim 1, wherein the memory controller further comprises logic to provide the data over the memory mode interface to the embedded processor to enable the embedded processor to perform at least one of: localized searching, localized error correction, expression pattern matching or data copying on the data without transferring the data to the host system.

6. The apparatus of claim 1, wherein the memory controller further comprises logic to maintain an address map to write data to the byte-addressable write-in-place non-volatile memory using the block storage mode and to access the data from the byte-addressable write-in-place non-volatile memory using the memory mode.

7. The apparatus of claim 1, wherein the memory controller further comprises logic to maintain an address mapping to write data to the byte-addressable write-in-place non-volatile memory using the memory mode and access the data from the byte-addressable write-in-place non-volatile memory using the block storage mode.

8. The apparatus of claim 1, wherein the memory mode enables the memory controller to access the data from the byte-addressable write-in-place non-volatile memory at a more granular level as compared to the block storage mode.

9. The apparatus of claim 1, wherein the memory mode enables the memory controller to access the data from the byte-addressable write-in-place non-volatile memory in a reduced period of time as compared to the block storage mode.

10. The apparatus of claim 1, wherein the memory mode enables the memory controller to access the data from the byte-addressable write-in-place non-volatile memory with a reduced level of power consumption as compared to the block storage mode.

11. The apparatus of claim 1, wherein the memory controller further comprises logic to perform media management in the byte-addressable write-in-place non-volatile memory, where the media management is abstracted from the data that is accessed by the memory controller from the byte-addressable write-in-place non-volatile memory using the memory mode.

12. The apparatus of claim 1, wherein the apparatus is a solid state drive (SSD).

13. A computing system, comprising:
   a host system having a host processor; and
   a memory device, comprising:
      a memory controller;
      an embedded processor;
      a byte-addressable write-in-place non-volatile memory communicatively coupled to the memory controller:
      a block storage interface communicatively coupled to the host system, to the embedded processor, and to the memory controller;
      a memory mode interface communicatively coupled between the embedded processor and the memory controller, the memory controller comprising logic to:
         receive a data operation request for data; and
         if the data operation request is received from the host system over the block storage interface, access the data in the byte-addressable write-in-place non-volatile memory in a block storage mode using block addressing;
         if the data operation request is received from the embedded processor over the memory mode interface, access the data in the byte-addressable write-in-place non-volatile memory in a memory mode using memory addressing.

14. The computing system of claim 13, wherein the block storage mode is a logical block addressing (LBA) scheme.

15. The computing system of claim 13, wherein the memory mode is a byte-addressable write-in-place addressing scheme.

16. The computing system of claim 13, wherein the embedded processor comprises logic to:
   access the data from the byte-addressable write-in-place non-volatile memory via the memory controller over the memory mode interface; and
   perform localized searching or localized error correction on the data without transferring the data to the host system.

17. The computing system of claim 13, wherein the memory controller further comprises logic to access same data from the byte-addressable write-in-place non-volatile memory using the block storage mode or the memory mode.

18. The computing system of claim 13, wherein the memory device is a solid-state drive (SSD).

19. The computing system of claim 13, further comprising one or more of:
   a display communicatively coupled to the host system;
   a network interface communicatively coupled to the host system; or
   a battery coupled to the host system.

20. A method for accessing data from a byte-addressable write-in-place non-volatile memory, the method comprising:

receiving, at a memory controller of a memory device, a first command to access data from the byte-addressable write-in-place non-volatile memory of the memory device, wherein the first command is received from a host system;

accessing, by the memory controller, the data from the byte-addressable write-in-place non-volatile memory using a block storage mode, wherein the data is provided from the memory controller to the host system over a block storage interface in response to the first command;

receiving, at the memory controller of the memory device, a second command to access data from the byte-addressable write-in-place non-volatile memory of the memory device, wherein the second command is received from an embedded processor; and accessing, by the memory controller, the data from the byte-addressable write-in-place non-volatile memory using a memory mode, wherein the data is provided from the memory controller to the embedded processor over a memory mode interface in response to the second command.

21. The method of claim 20, wherein the block storage mode is a logical block addressing (LBA) scheme.

22. The method of claim 20, wherein the memory mode is a byte-addressable write-in-place addressing scheme.

23. The method of claim 20, further comprising providing the data over the memory mode interface to the embedded processor to enable the embedded processor to perform localized searching or localized error correction on the data without transferring the data to the host system.

24. The method of claim 20, further comprising maintaining an address map to write data to the byte-addressable write-in-place non-volatile memory using the block storage mode and access the data from the byte-addressable write-in-place non-volatile memory using the memory mode.

25. The method of claim 20, further comprising maintaining an address map to store data to the byte-addressable write-in-place non-volatile memory using the memory mode and read the data from the byte-addressable write-in-place non-volatile memory using the block storage mode.

\* \* \* \* \*